US008055683B2

(12) United States Patent
Brodhun et al.

(10) Patent No.: US 8,055,683 B2
(45) Date of Patent: Nov. 8, 2011

(54) MANAGEMENT OF RELATIONSHIPS BETWEEN DATABASE TABLES

(75) Inventors: Mark A. Brodhun, Byron, MN (US); Richard D. Dettinger, Rochester, MN (US); Janice R. Glowacki, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1747 days.

(21) Appl. No.: 10/965,186

(22) Filed: Oct. 14, 2004

(65) Prior Publication Data

US 2006/0085437 A1 Apr. 20, 2006

(51) Int. Cl.
*G06F 7/00* (2006.01)
(52) U.S. Cl. ............................ 707/803; 707/769; 705/50
(58) Field of Classification Search .......... 700/100–102; 707/100–102, 103, 803
See application file for complete search history.

(56) References Cited

U.S. PATENT DOCUMENTS

| | | | |
|---|---|---|---|
| 5,253,362 A | 10/1993 | Nolan et al. | |
| 5,734,887 A * | 3/1998 | Kingberg et al. | 707/4 |
| 6,460,043 B1 | 10/2002 | Tabbara et al. | |
| 6,553,368 B2 | 4/2003 | Martin et al. | |
| 6,601,058 B2 * | 7/2003 | Forster et al. | 707/3 |
| 6,601,065 B1 | 7/2003 | Nelson et al. | |
| 6,725,227 B1 | 4/2004 | Li | |
| 6,768,986 B2 * | 7/2004 | Cras et al. | 707/2 |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,024,425 B2 | 4/2006 | Krishnaprasad et al. | |
| 7,096,229 B2 | 8/2006 | Dettinger et al. | |
| 7,146,376 B2 * | 12/2006 | Dettinger et al. | 707/102 |
| 2002/0065854 A1 * | 5/2002 | Pressly | 707/530 |
| 2003/0216939 A1 * | 11/2003 | Bito et al. | 705/2 |

OTHER PUBLICATIONS

Patent U.S. Appl. No. 10/083,075, "Application Portability and Extensibility Through Database Schema and Query Abstraction", filed Feb. 26, 2002.
Llama, "Search Your Database", Jan. 18, 2002, Codewalkers, pp. 1-4.
Meng, Weiyi, et al, "A Theory of Translation From Relational Queries to Hierarchical Queries", Apr. 1995, IEEE, pp. 228-245.

* cited by examiner

*Primary Examiner* — Etienne Leroux
*Assistant Examiner* — Mohammad Rahman
(74) *Attorney, Agent, or Firm* — Patterson & Sheridan, LLP

(57) ABSTRACT

A method, system and article of manufacture for managing relationships between database tables and, more particularly, for identifying and accurately describing relationships between tables in a database. One embodiment provides a method for identifying relationships between tables in a database. The method comprises receiving user input selecting a plurality of tables from the database. The plurality of tables is organized into a logical island defining a logical unit related to a particular logical entity. The method further comprises receiving user input identifying, for each of the plurality of tables, a table column containing information that identifies the particular logical entity in the table, whereby the identified table columns of different tables define logical relationships between the different tables in the logical island. On the basis of the identified table columns, relations specifications are created which describe the logical relationships between the different tables in the logical island.

20 Claims, 6 Drawing Sheets

MANAGEMENT OF RELATIONSHIPS BETWEEN DATABASE TABLES

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to data processing and, more particularly, to managing relationships between database tables.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

A relational database management system (RDBMS) is a computer database management system that uses relational techniques for storing and retrieving data in/from tables in a relational database. A RDBMS can be structured to support a variety of different types of operations for a requesting entity (e.g., an application, the operating system or an end user). Such operations can be configured to retrieve, add, modify and delete information being stored and managed by the RDBMS. Standard database access methods support these operations using high-level query languages, such as the Structured Query Language (SQL). The term "query" denominates a set of commands that cause execution of operations for processing data from a stored database. Any requesting entity, including applications, operating systems and, at the highest level, users, can issue queries against data in a database to obtain required information. Queries may be predefined (i.e., hard coded as part of an application) or generated in response to input (e.g., user input). Upon execution of a query against a database, a query result is returned to the requesting entity. The requesting entity may thus analyze the query result to identify required information therefrom.

One of the most common executed SQL queries is the SELECT statement. A SELECT statement generally has the format: "SELECT<clause> FROM<clause> WHERE<clause> GROUP BY<clause> HAVING<clause> ORDER BY<clause>". The clauses must generally follow this sequence. Only the SELECT and FROM clauses are required and all other clauses are optional. The result of a SELECT statement is, in general, a subset of data retrieved from one or more existing tables stored in a relational database. The subset of data defines the query result which is treated as a new table, termed the result table. The WHERE clause determines which rows should be returned in the result table. Generally, the WHERE clause contains one or more query conditions that must be satisfied by each row returned in the result table. The FROM clause identifies the name of the existing table(s) from which the result table is being determined. Thereby, the FROM clause may define an implicit join operation. More specifically, a given SQL query may not contain a specific join keyword or statement, but may simply be configured to select data from multiple relevant database tables.

For example, assume a user in a hospital who wants to determine all medical tests which have been performed on a given patient "Bob" and all diagnoses that have been established for this patient. To this end, the user may specify the following exemplary SQL query of Table I below:

TABLE I

EXEMPLARY SQL QUERY

| | |
|---|---|
| SELECT | T1.ID, T1.Name, |
| | T2.Value AS Test, |
| | T3.Value AS Diagnosis |
| FROM | Demographic T1, |
| | Test T2, |
| | Diagnosis T3 |
| WHERE | T1.Name = 'Bob' AND |
| | T1.ID = T2.ID AND |
| | T1.ID = T3.ID |

In the given example of Table I, the FROM clause of the exemplary SQL query defines an implicit join operation with respect to the database tables "Demographic" (as T1), "Test" (as T2) and "Diagnosis" (as T3). The WHERE clause indicates the columns (i.e., "T1.ID", "T2.ID" and "T3.ID") through which the tables to be joined (i.e., "Demographic", "Test" and "Diagnosis") are linked. In other words, the tables "Demographic", "Test" and "Diagnosis" are related to each other by predefined relationships defined by the respective "ID" columns.

More generally, the tables in any relational database are related to each other according to predefined relationships. Frequently, such relationships are defined as primary key—foreign key relationships specified by an administrator or developer of the relational database. Thus, upon receipt of a given query against a relational database, relevant tables from the relational database can be joined according to the predefined relationships in order to produce interesting data requested by the given query. However, in order to enable a corresponding requesting entity to correctly formulate the given query, the corresponding requesting entity must be aware of the relationships between the relevant tables. Therefore, the administrator may create relations describing the predefined relationships which can be used by the requesting entity for the creation of the given query.

One difficulty when defining relations between different database tables is that the process of creating such relations is often time consuming, especially if a given relational database includes a great number of database tables. For instance, assume a relational database that is organized in a star schema or a snowflake schema. A star schema is a database schema having a single root table connected to a multiplicity of linked tables. A snowflake schema corresponds to several connected star schemas. In a database that is organized in a star schema, the number of relationships between the tables is normally only one less than the number of tables. Accordingly, if the database includes thousands of tables, there are thousands of relationships and, thus, thousands of relations to create. In a database that is organized in a snowflake schema, the number of relationships between the tables can be higher than the number of tables as in the snowflake schema a given table can be linked to more than one other table. However, with so many relations to create it is quite easy for the administrator or developer to make a mistake causing relations to be missing or tables being joined in multiple ways. Furthermore, if primary key—foreign key relationships are used to create the relations, false referential integrity constraints may occur at a later stage if the primary key column is deleted. Such missing or wrong relations may then lead to incorrect query results as tables cannot be linked correctly in execution of a given query.

Therefore, there is a need for an efficient technique for identifying and describing relations between tables in a database.

SUMMARY OF THE INVENTION

The present invention is generally directed to a method, system and article of manufacture for managing relationships between database tables and, more particularly, for identifying and describing relationships between tables in a database.

One embodiment provides a method for identifying relationships between tables in a database. The method comprises receiving user input selecting a plurality of tables from the database. The plurality of tables is organized into a logical island defining a logical unit related to a particular logical entity. The method further comprises receiving user input identifying, for each of the plurality of tables, a table column containing information that identifies the particular logical entity in the table, whereby the identified table columns of different tables define logical relationships between the different tables in the logical island. On the basis of the identified table columns, relations specifications are created which describe the logical relationships between the different tables in the logical island.

Another embodiment provides a computer-readable medium containing a program which, when executed by a processor, performs operations for identifying relationships between tables in a database. The operations comprise providing a table selection display area allowing a user to select a plurality of tables from the database and providing a relations identification display area. The relations identification display area allows the user to organize the plurality of tables into a logical island defining a logical unit related to a particular logical entity. The relations identification display area further allows the user to identify, for each of the plurality of tables, a table column containing information that identifies the particular logical entity in the table, whereby the identified table columns of different tables define logical relationships between the different tables in the logical island. On the basis of the identified table columns, relations specifications are created which describe the logical relationships between the different tables in the logical island.

Still another embodiment provides a system, comprising a database, a relations identification user interface and a relationship manager. The relations identification user interface allows a user to identify relationships between tables in the database. The relationship manager is configured for creating relations specifications describing the relationships identified via the relations identification user interface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
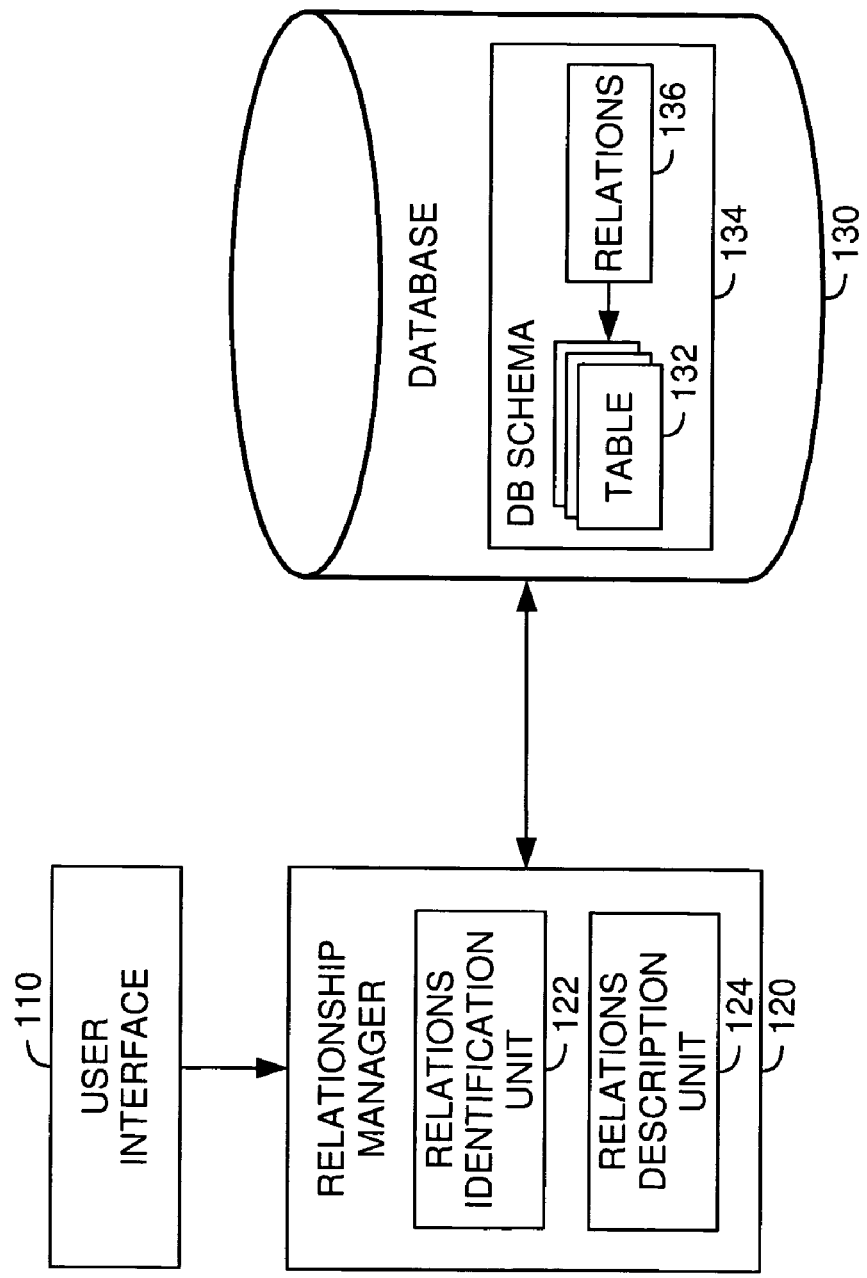
FIG. 1 is a relational view of software components in one embodiment.

The present invention is generally directed to a method, system and article of manufacture for managing relationships between database tables and, more particularly, for identifying and accurately describing relationships between tables in a database. According to aspects of the invention, the database is organized in a star schema or a snowflake schema. A star schema is a database schema having a single root table connected to a multiplicity of linked tables. A snowflake schema corresponds to several connected star schemas.

In one embodiment, relationships between different tables of a database are identified by a user via a corresponding user interface. More specifically, using the user interface the user can select a plurality of tables from the database. At least a portion of the selected plurality of tables includes information that is related to a common subject. Accordingly, the at least one portion of the plurality of tables can be organized into a logical unit which is related to the common subject. The user may further use the user interface to identify, for each table contained in the logical unit, a table column containing the information that identifies the common subject in the table. The identified table columns of different tables define relationships between the different tables from the logical unit. The relationships between the different tables can be described by corresponding relations specifications. These relations specifications are created on the basis of the identified table columns.

In one embodiment, at least one other portion of the selected plurality of tables can be organized into another logical unit which is related to a distinct common subject. Furthermore, a particular table from the logical unit and a particular table from the other logical unit may include information that is related to a particular subject, which may be distinct from the common subject and/or the distinct common subject. In this case, the user can use the user interface to link the logical unit and the other logical unit. In one embodiment, the user identifies for each of the particular table from the logical unit and the particular table from the other logical unit a table column containing the information that identifies the particular subject. The identified table columns define a relationship between the logical unit and the other logical unit. This relationship can also be described by a corresponding relation specification which is created on the basis of the identified table columns.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular databases, including a relational database, the invention is not limited to a particular database, standard or version. Accordingly, persons skilled in the art will recognize that the invention is adaptable to other databases.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary Computing Environment

Referring now to FIG. 1, a relational view of software components in one embodiment is illustrated. According to one aspect, the software components are configured for identifying relationships between database tables and creating relations specifications which describe the identified relationships. Illustratively, the software components include a user interface 110, a relationship manager 120 and a database 130.

The database 130 is representative of any collection of data regardless of the particular physical representation of the data. A physical representation of data defines an organizational structure of the data. By way of illustration, the database 130 may be organized according to a relational structure (accessible by SQL queries) or according to an XML structure (accessible by XML queries). However, the invention is not limited to a particular structure and contemplates extension to structures presently unknown. As used herein, the term "structure" generically refers to a particular arrangement of data.

In one embodiment, the database 130 is abstractly described by a data abstraction model having a plurality of logical field specifications. Each logical field specification defines a particular logical field that is mapped to one or more physical entities of data of an underlying data representation being used in the database 130 (e.g., XML, SQL, or other type representation). For instance, each logical field can be associated with one or more columns of tables from the database 130. Specifically, in the data abstraction model the logical fields are defined independently from the underlying data representation, thereby allowing queries to be formed that are loosely coupled to the underlying data representation. An abstract query can be configured to access data in the database 130 and return query results, or to modify (i.e., insert, delete or update) the data. For execution against the data, the abstract query is transformed into a form (referred to herein as concrete query) consistent with the underlying data representation of the data. An exemplary data abstraction model and techniques for transformation of abstract queries into concrete queries are described in detail in the commonly owned, co-pending U.S. patent application Ser. No. 10/083,075, entitled "Application Portability And Extensibility Through Database Schema And Query Abstraction," filed Feb. 26, 2002, which is incorporated by reference in its entirety.

Illustratively, the database 130 includes a plurality of tables 132 which are related to each other in a given database schema 134. By way of example, the tables 132 are related to each other according to relationships which define a star schema or a snowflake schema. An exemplary star schema is described below with reference to FIG. 2A. An exemplary snowflake schema is described below with reference to FIG. 2B.

The relationship manager 120 illustratively includes a relations identification unit 122 and a relations description unit 124. According to one aspect, the relations identification unit 122 operates to identify the relationships between the plurality of tables 132. The relations description unit 124 operates to create relations specifications 136 which describe the identified relationships.

More specifically, in one embodiment the relations identification unit 122 receives user input from the user interface 110. Using the user interface 110, the user can select tables from the plurality of tables 132. The selected tables are related to a particular logical entity that represents a common subject for the selected tables (e.g., each table may contain information related to a patient, company, particular test, procedure, or the like). The relations identification unit 122 organizes the selected tables into a logical island defining a logical unit related to the particular logical entity. In other words, the logical island is characterized by the logical entity. The relations identification unit 122 further receives user input via the user interface 110 which identifies, for each of the selected tables, a table column containing information that identifies the particular logical entity in the table. The identified table columns of different selected tables define relationships between the different selected tables in the logical island.

Figure 3:
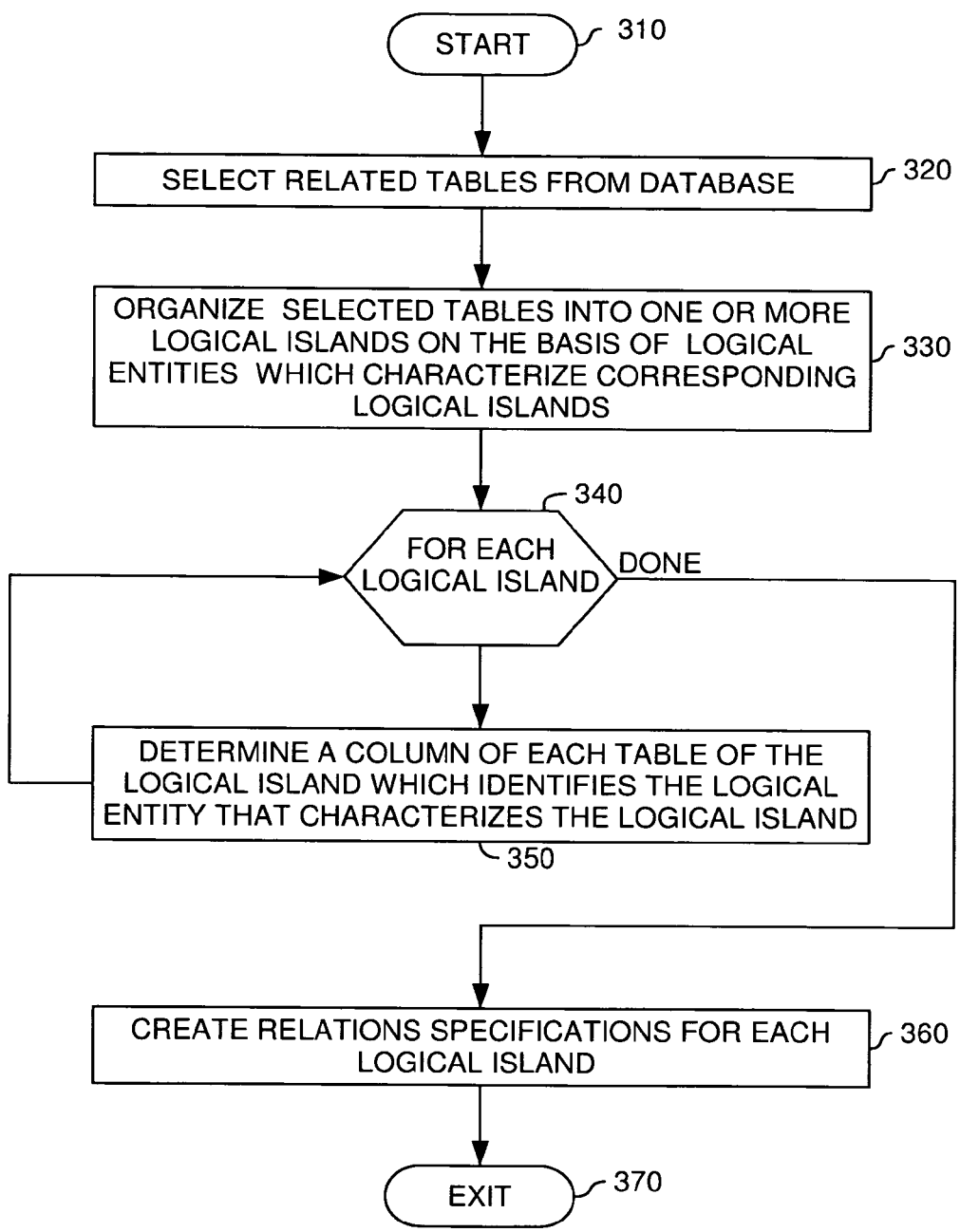
FIG. 3 is a flowchart illustrating a method for identifying relationships between database tables and creating corresponding relations specifications in one embodiment.

On the basis of the identified table columns, the relations description unit 124 creates the relations specifications 136. The relations specifications 136 describe the relationships between the different tables in the logical island. In one embodiment, the user may initiate the creation of the relations specifications 136 using the user interface 110. An exemplary method of identifying relationships and creating relations specifications is described below with reference to FIG. 3.

Figure 4:
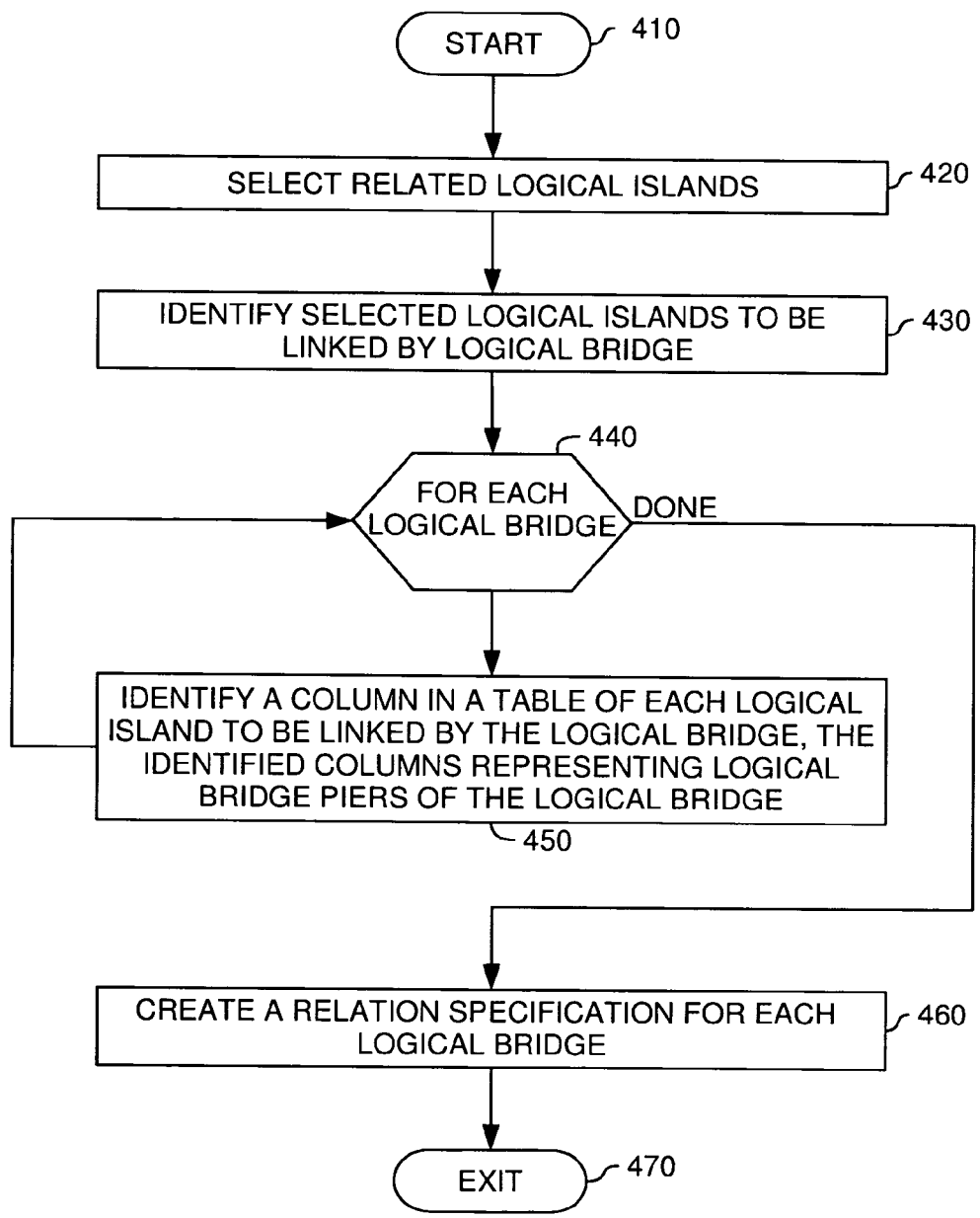
FIG. 4 is a flow chart illustrating a method for defining logical bridges between logical islands and creating corresponding relations specifications in one embodiment.

The relationship manager 120 may further be used to define logical bridges between distinct logical islands. For each defined logical bridge, a corresponding relation specification can be created in the relations specifications 136. An exemplary method of defining a logical bridge between two different logical islands and creating a corresponding relation specification is described below with reference to FIG. 4.

Exemplary Database Schemas

Figure 2A:
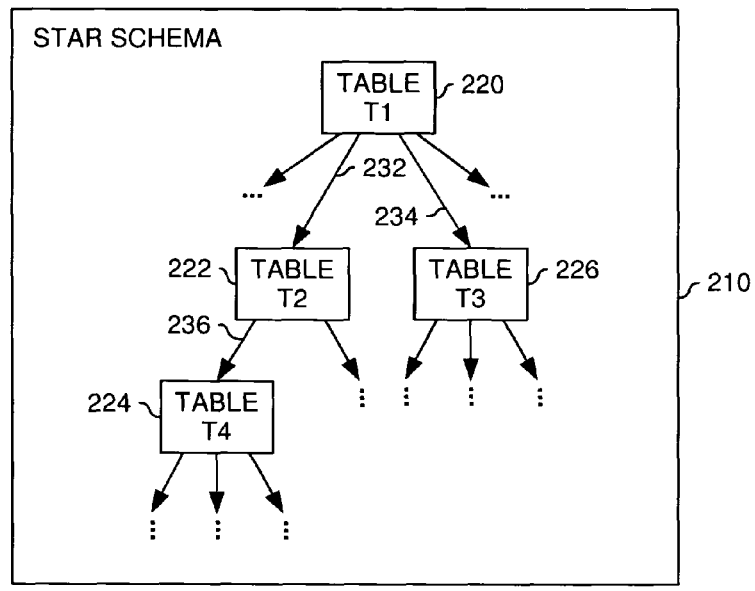
FIGS. 2A-B are illustrations of exemplary database schemas according to aspects of the invention.

Referring now to FIG. 2A, an exemplary star schema 210 illustrating the database schema 134 of FIG. 1 is shown. The exemplary star schema 210 includes a plurality of tables (e.g., tables 132 of FIG. 1) contained in a database (e.g., database 130 of FIG. 1). By way of example, the star schema 210 includes tables 220 "Table T1", 222 "Table T2", 224 "Table T4" and 226 "Table T3".

In general, a star schema includes a single root table and a multiplicity of branches, each including one or more tables. Each branch is connected to the single root table and may define one or more parent-child relations. Accordingly, a star schema may define a multiplicity of parent-child relations.

In the illustrated example, the table 220 "Table T1" is the root table of the star schema 210. The root table "Table T1" is illustratively connected to a first branch including tables 222 "Table T2" and 224 "Table T4". In the first branch, the root table 220 "Table T1" is linked to the table 222 "Table T2", as illustrated by a connector 232. The table 222 "Table T2" in turn is connected to the table 224 "Table T4", as illustrated by a connector 236. Specifically, the tables 222 "Table T2" and 224 "Table T4" define a parent-child relation with table 222 "Table T2" being the "parent" and table 224 "Table T4" being the "child". The root table 220 "Table T1" is further connected to a second branch which includes table 226 "Table T3", as illustrated by a connector 234.

It should be noted that the illustrated connectors 232, 234, and 236 represent exemplary relationships between the tables 220, 222, 224 and 226, respectively. However, each of the tables 220, 222, 224 and 226 can further be related to one or more other tables of the star schema 210. If one of the tables 220, 222, 224 and 226 of the star schema 210 is related to a table of another star schema, both star schemas define a snowflake schema, as described below with reference to FIG. 2B.

Figure 2B:
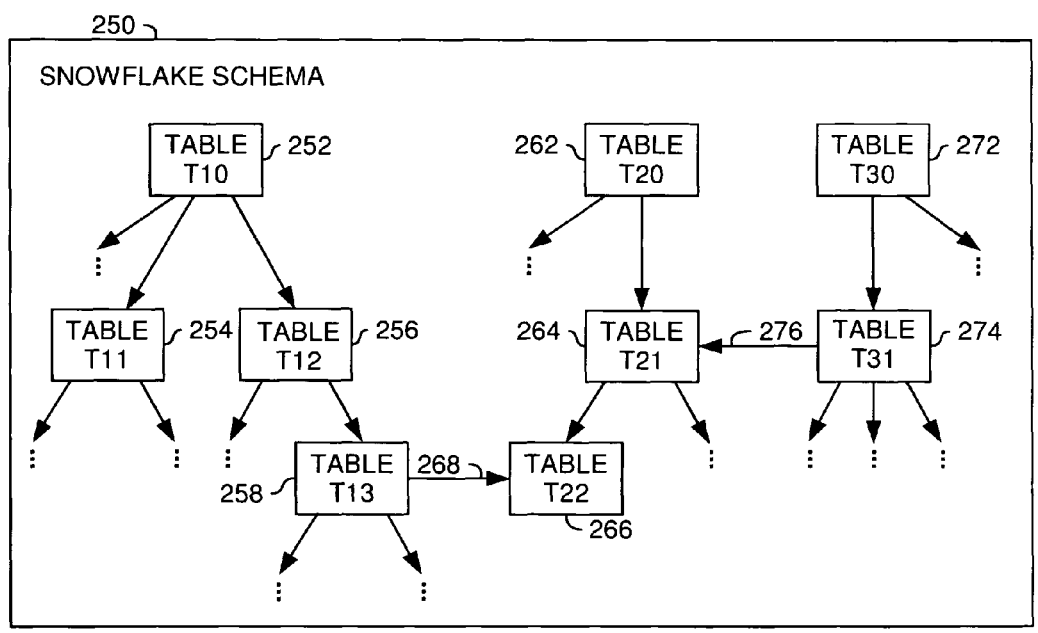

Referring now to FIG. 2B, an exemplary snowflake schema 250 illustrating the database schema 134 of FIG. 1 is shown. The exemplary snowflake schema 250 includes a plurality of tables (e.g., tables 132 of FIG. 1) contained in a database (e.g., database 130 of FIG. 1). By way of example, the star schema 250 includes tables 252 "Table T10", 254 "Table T11", 256 "Table T12", 258 "Table T13", 262 "Table T20", 264 "Table T21", 266 "Table T22", 272 "Table T30" and 274 "Table T31".

In general, a snowflake schema corresponds to several connected star schemas. Each star schema may define one or more parent-child relations, as explained above with reference to FIG. 2A. In the illustrated example, the snowflake schema 250 includes three connected star schemas: (i) a first star schema which includes tables 252 "Table T10", 254 "Table T11", 256 "Table T12" and 258 "Table T13", (ii) a second star schema which includes tables 262 "Table T20", 264 "Table T21" and 266 "Table T22", and (iii) a third star schema which includes tables 272 "Table T30" and 274 "Table T31". The table 252 "Table T10" is the root table of the first star schema, the table 262 "Table T20" is the root table of the second star schema and the table 272 "Table T30" is the root table of the third star schema. By way of example, the first star schema is connected to the second star schema via a relationship between tables 258 "Table T13" and 266 "Table T22", as illustrated by a connector 268. The second star schema is connected to the third star schema via a relationship between tables 264 "Table T21" and 274 "Table T31", as illustrated by a connector 276.

It should be noted that each of the three star schemas defines one or more parent-child relations. For instance, in the second star schema the tables 264 "Table T21" and 266 "Table T22" define a parent-child relation with table 264 "Table T21" being the "parent" and table 266 "Table T22" being the "child". Furthermore, as illustrated, each of the tables 252, 254, 256, 258, 262, 264, 266, 272 and 274 can further be related to one or more other tables.

Defining Logical Islands

As was noted above, relationships between different tables in a database can be identified and corresponding relations specifications describing the identified relationships can be created. An exemplary method 300 for identifying relationships between database tables in order to create corresponding relations specifications is now described with reference to FIG. 3. At least part of the steps of method 300 is performed using a user interface (e.g., user interface 110 of FIG. 1) and/or a relationship manager (e.g., relationship manager 120 of FIG. 1). Method 300 starts at step 310.

In one embodiment, related tables are selected at step 320 by a user using the user interface. By way of example, the related tables are selected from a plurality of available tables (e.g., tables 132 of FIG. 1) stored in a given database (e.g., database 130 of FIG. 1). Assume now that the user selects five database tables: (1) a "Demographic" table containing information about patients in a hospital, (2) a "Diagnosis" table containing information about diagnoses that are established for patients of the hospital, (3) a "Payments" table containing information about payments that the hospital charges to patient accounts, (4) an "Insurance Company" table containing information about insurance companies, and (5) an "Insurance Payments" table containing information about payments that the hospital receives from insurance companies. Selecting related tables from the database is described in more detail below with reference to FIG. 5A.

At step 330, the selected tables are organized into one or more logical islands. Each logical island is related to a particular logical entity. More specifically, in a given logical island the logical entity represents a common subject for all tables which are organized into this given logical island. For instance, assume that in the given example each patient of the hospital is uniquely identified in the "Demographic" table using a patient identifier. In the "Diagnosis" table, information with respect to one or more diagnoses is stored for one or more patients. Accordingly, each diagnosis can be associated with a corresponding patient identifier to uniquely identify a corresponding patient for whom a given diagnosis is established. In the "Payments" table, information with respect to one or more payments that are charged to the account(s) of one or more patients of the hospital is stored. Each payment can be associated with a patient identifier to uniquely identify a patient having a corresponding account. Accordingly, the "Demographic", "Diagnosis" and "Payments" tables are related to a common subject, i.e., the "patient". Thus, the "Demographic", "Diagnosis" and "Payments" tables can be organized into a first logical island related to the logical entity "patient". Assume further that each insurance company is uniquely identified in the "Insurance company" table using a company identifier. In the "Insurance Payments" table, each payment that the hospital receives from an insurance company for a patient is associated with the company identifier. Thus, the insurance company which pays for a given patient can be uniquely identified. Accordingly, the "Insurance Company" and "Insurance Payments" tables are also related to a common subject, i.e. the "insurance company". In other words, the "Insurance Company" and "Insurance Payments" tables can be organized into a second logical island related to the logical entity "insurance company". Organizing the selected tables into one or more logical islands is described in more detail below with reference to FIG. 5B.

At step 340, a loop consisting of steps 340 and 350 is performed for each logical island. In other words, for a given logical island the loop is entered at step 340. At step 350, information that characterizes a given logical entity is identified from each table included with the logical island. More specifically, a table column containing information that identifies the given logical entity is identified in each of the one or more tables defining the given logical island. In one embodiment, the identification is performed by the user using the user interface.

For instance, assume that in the given example the loop consisting of steps 340 and 350 is first entered for the first logical island. Accordingly, at step 350 a column in each of the "Demographic", "Diagnosis" and "Payments" tables is identified which contains information related to the logical entity "patient". By way of example, assume that the "Demographic" table contains a column "id" which defines a unique patient identifier for each patient. Assume further that each of the "Diagnosis" and "Payments" tables contains a column "patient_id" including patient identifiers that correspond to patient identifiers of the "Demographic" table. In other words, the identified table columns "id" and "patient_id" define relationships between the different tables in the first logical island, i.e., the "Demographic", "Diagnosis" and "Payments" tables. As these relationships are based on the particular logical entity, they are hereinafter interchangeably referred to as "logical" relationships. As no other table is contained in the first logical island, step 350 and thus the loop consisting of steps 340 and 350 is completed for the first logical island. Then the loop is entered at step 340 for the second logical island. Accordingly, at step 350 a column in each of the "Insurance Company" and "Insurance Payments" tables is identified, which contains information related to the logical entity "Insurance Company". By way of example, assume that the "Insurance Company" table contains a column "id" including company identifiers which uniquely identify each insurance company. Assume further that the "Insurance Payments" table contains a column "company_id" including company identifiers that correspond to company identifiers of the "id" column of the "Insurance Company" table. In other words, the identified table columns "id" and "company_id" define logical relationships between the different tables in the second logical island, i.e., the "Insurance Company" and "Insurance Payments" tables. Identifying table columns which contain information related to corresponding logical entities is described in more detail below with reference to FIG. 5C.

In one embodiment, identification of the table columns at step 350 includes identification of cardinalities of the corresponding logical relationships. The determination can be performed by the user using the user interface. For instance, assume that it is determined that each patient identifier occurs only once in the "id" column of the "Demographic" table in order to uniquely identify each patient. Thus, the "id" column of the "Demographic" table has the cardinality "one". Furthermore, assume that each patient identifier may occur many times in the "patient_id" column of the "Diagnosis" and "Payments" tables, respectively. In other words, many diagnoses and many payments can be associated with a single patient. Thus, each of the "patient_id" columns of the "Diagnosis" and "Payments" tables has the cardinality "many". Accordingly, a "one-to-many" relationship has been identified between the "Demographic" and each of the "Diagnosis" and "Payments" tables. Assume further that it is determined with respect to the "Insurance Company" table that each company identifier occurs only once in the "id" column of the "Insurance Company" table in order to uniquely identify each insurance company. Thus, the "id" column of the "Insurance Company" table has the cardinality "one". Moreover, assume that each company identifier may occur many times in the "company_id" column of the "Insurance Payments" table. In other words, many payments can be received from a single insurance company. Accordingly, a "one-to-many" relationship has been identified between the "Insurance Company" and the "Insurance Payments" table.

When processing of all logical islands according to the loop consisting of steps 340 and 350 has been completed, the method 300 continues at step 360. At step 360, relations specifications (e.g., relations specifications 136 of FIG. 1) describing the logical relationships between the different tables in the logical islands are created on the basis of the identified table columns. Method 300 then exits at step 370.

Exemplary relations specifications which are created on the basis of the logical relationships which have been identified in the given example are shown in Table II below. By way of illustration, the exemplary relations specifications are defined using XML. However, any other language may be used to advantage.

TABLE II

| | EXEMPLARY RELATIONS SPECIFICATIONS |
|---|---|
| 001 | <Relations > |
| 002 |   <Link source="Demographic" target="Diagnosis" cardinality="onetomany"> |
| 003 |     <LinkPoint source="id" target="patient_id"/> |
| 004 |   </Link> |
| 005 |   <Link source="Demographic" target="Payments" cardinality="onetomany"> |
| 006 |     <LinkPoint source="id" target="patient_id"/> |
| 007 |   </Link> |
| 008 |   <Link source="InsurancePayments" target="InsuranceCompany" |
| 009 |     cardinality="manytoone"> |
| 010 |     <LinkPoint source="company_id" target="id"/> |
| 011 |   </Link> |
| 012 | </Relations> |

By way of example, lines 002-004 of Table II specify the logical relationship between the tables "Demographic" (source="Demographic") and "Diagnosis"

(target="Diagnosis") in the given example. Illustratively, the "Demographic" table is declared as "source" and the "Diagnosis" table is declared as "target". According to line 003, the tables are related via the "ID" column of the source table, i.e., the "Demographic" table, and the "Patient_id" column of the target table, i.e., the "Diagnosis" table. As was noted above, the cardinality of the "id" column in the "Demographic" table is "one" and the cardinality of the "patient_id" column in the "Diagnosis" table is "many". Thus, according to line 002 a cardinality of one-to-many (cardinality="onetomany") is defined for the relationship between the "Demographic" and "Diagnosis" tables. Similarly, the logical relationship between the tables "Demographic" and "Payments" is specified in lines 005-007 and the logical relationship between the "Insurance Company" and "Insurance Payments" tables is specified in lines 008-011.

It should be noted that the relations specifications in lines 002-007 define the first logical island, while the relation specification in lines 008-001 defines the second logical island. It should further be noted that the declaration of the tables as being "source" and "target" is required to enable for a correct specification of the relationship cardinalities. Specifically, it is understood that in the illustrated example the specification of the cardinality is always directed from "source" to "target". More specifically, as was noted above the logical relationship between the "Insurance Company" and "Insurance Payments" tables is of the type one-to-many, i.e., each company identifier may only occur once in the "Insurance Company" table, but many times in the "Insurance Payments" table. However, in line 008 of Table II the "Insurance Company" table has illustratively been declared "target" and the "Insurance Payments" table has illustratively been declared "source". Therefore, the cardinality of the relationship between both tables has been specified as being "manytoone" (line 009 of Table II).

Defining Logical Bridges

As was noted above, logical bridges can be defined between different logical islands and corresponding relations specifications. Each logical bridge describes a logical relationship between two different logical islands. An exemplary method 400 for defining logical bridges between logical islands and for creating corresponding relations specifications is now described with reference to FIG. 4. At least part of the steps of method 400 is performed using a user interface (e.g., user interface 110 of FIG. 1) and/or a relationship manager (e.g., relationship manager 120 of FIG. 1). Method 400 starts at step 410.

In one embodiment, related logical islands are selected at step 420 by a user using the user interface. At step 430, pairs of logical islands to be linked by logical bridges are identified from the selected logical islands. Accordingly, a logical bridge can be specified for each identified pair of logical islands. For instance, assume that the user selects in the given example the first logical island (i.e., the logical island including the "Demographic", "Diagnosis" and "Payments" tables) and the second logical island (i.e., the logical island including the "Insurance Company" and "Insurance Payments" tables) at step 420. Furthermore, assume that the user indicates at step 430 that the first and the second logical island are to be linked by a logical bridge.

At step 440, a loop consisting of steps 440 and 450 is entered for each logical bridge, i.e., for each pair of logical islands of a logical bridge. At step 450, a particular table representing a logical bridge pier is selected from each logical island associated with a given logical bridge, i.e., a given pair of logical islands. A column of the particular table contains information that identifies a corresponding particular logical entity associated with the given logical bridge. This table column is, therefore, identified in each of the particular tables. Accordingly, each such identified table column represents a logical bridge pier of the given logical bridge. In one embodiment, the identification is performed by the user using the user interface.

For instance, assume that in the given example the loop consisting of steps 440 and 450 is entered for the logical bridge which has been specified between the first and the second logical island. Assume now that the "Payments" table of the first logical island includes a column which contains information that uniquely identifies each payment received from a given insurance company. For instance, the "Payments" table includes an "insurance_payment_number" column which contains payment identifiers. Assume further that the "Insurance Payments" table of the second logical island includes a column "payment_num" that also contains payment identifiers which correspond to payment identifiers in the "insurance_payment_number" of the "Payments" table. In other words, the columns "insurance_payment_number" and "payment_num" are both related to the logical entity "payment" and, thus, represent the logical bridge piers of the logical bridge between the first and the second logical island. Accordingly, at step 450 the columns "insurance_payment_number" and "payment_num" of the "Payments" and "Insurance Payments" tables are identified. Specifying logical bridges and Identifying table columns which contain information related to corresponding logical entities is described in more detail below with reference to FIG. 5D.

It should be noted that the logical entity "payment" which characterizes the logical bridge in the given example does not correspond to the logical entities of the first and the second logical island, i.e., "patient" and "insurance company". However, this non-correspondence has merely been illustrated by way of example and is not intended to limit the invention accordingly. For instance, in the given example the "Insurance Payments" table may alternatively include a column containing patient identifiers which correspond to patient identifiers in the "patient_id" column of the "Payments" table. In this case, the logical entity that characterizes the logical bridge could be the logical entity "patient" of the first logical island.

When processing of all logical bridges according to the loop consisting of steps 440 and 450 has completed, the method 400 continues at step 460. At step 460, relations specifications (e.g., relations specifications 136 of FIG. 1) describing the logical bridges between the different logical islands are created on the basis of the identified table columns. Method 400 then exits at step 470.

An exemplary relation specification which is created on the basis of the logical bridge which has been specified in the given example is shown in Table III below. By way of illustration, the exemplary relation specification is defined using XML. However, any other language may be used to advantage.

TABLE III

EXEMPLARY RELATION SPECIFICATION

```
001    <Relations >
002       <Link source="Payments" target="Insurance Payments"
cardinality="onetoone">
003       <LinkPoint source="insurance_payment_number"
          target="payment_num"/>
```

TABLE III-continued

EXEMPLARY RELATION SPECIFICATION

```
004         </Link>
005     </Relations>
```

By way of example, lines 002-004 of Table III define the logical bridge between the tables "Payments" (source="Payments") and "Insurance Payments" (target="Insurance Payments") in the given example. Illustratively, the "Payments" table is declared as "source" and the "Insurance Payments" table is declared as "target". According to line 003, the tables are related via the "insurance_payment_number" column of the source table, i.e., the "Payments" table, and the "payment_num" column of the target table, i.e., the "Insurance Payments" table. The cardinality of the "insurance_payment_number" column in the "Payments" table is "one" and the cardinality of the "payment_num" column in the "Insurance Payments" table is also "one". Thus, according to line 002 a cardinality of one-to-one (cardinality="onetoone") is defined for the logical bridge between the "Payments" and "Insurance Payments" tables.

In one embodiment, the relations specifications which are created for the logical bridges are merged with the relations specifications which are created for the logical islands. In other words, the relations specifications shown in Table II can be merged with the relation specification shown in Table III. Exemplary merged relations specifications are shown in Table IV below. By way of illustration, the exemplary merged relations specifications are defined using XML. However, any other language may be used to advantage.

TABLE IV

EXEMPLARY MERGED RELATIONS SPECIFICATIONS

```
001     <Relations>
002         <Link source="Demographic" target="Diagnosis"
            cardinality="onetomany">
003             <LinkPoint source="id" target="patient_id"/>
004         </Link>
005         <Link source="Demographic" target="Payments"
            cardinality="onetomany">
006             <LinkPoint source="id" target="patient_id"/>
007         </Link>
008         <Link source="Payments" target="Insurance Payments"
cardinality="onetoone">
009             <LinkPoint source="insurance_payment_number"
                target="payment_num"/>
010         </Link>
011         <Link source="InsurancePayments"
            target="InsuranceCompany"
012             cardinality="manytoone">
013             <LinkPoint source="company_id" target="id"/>
014         </Link>
015     </Relations>
```

As can be seen from Table IV, the relations specifications from Table II are included in lines 002-007 and 011-014 and the relation specification of Table III is included in lines 008-010. By way of example, the relation specification that defines the logical bridge has been introduced into lines 008-010 to delimit the relations specifications defining the first logical island (lines 002-007) against the relation specification defining the second logical island (lines 011-014).

As was noted above, in one embodiment the database (e.g., database 130 of FIG. 1) containing the database tables (e.g., tables 132 of FIG. 1) which define the logical islands is abstractly described by a data abstraction model. The data abstraction model may include a plurality of logical field specifications, each defining a particular logical field associated with one or more columns of the tables from the database. In this case, the relations specifications of Table IV can be created as abstract relations specifications. These abstract relations specifications describe the identified relationships between the tables in the specified logical island(s), thereby linking logical fields of the data abstraction model to each other. The abstract relations specifications may further describe the relationship(s) of the specified logical bridge(s). In this case, the abstract relations specifications can be included with the data abstraction model.

An Exemplary User Interface

As was noted above, a user may use a suitable user interface (e.g., user interface 110 of FIG. 1) for specifying logical islands. The user may further use a suitable user interface for specification of logical bridges between logical islands. An exemplary user interface which allows user specification of logical islands and logical bridges is described below with reference to FIGS. 5A-D.

Figure 5A:
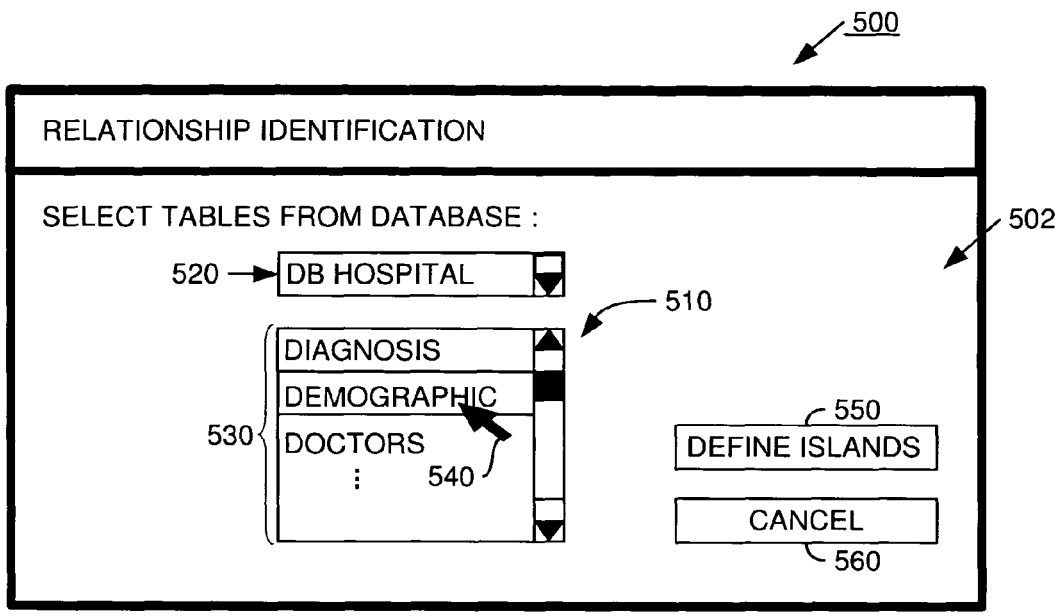
FIGS. 5A-D are illustrations of exemplary user interfaces for managing relationships between different database tables.

Referring now to FIG. 5A, an exemplary user interface 500 having a table selection display area 502 is shown. The table selection display area 502 is configured to allow selection of related tables from a database (e.g., database 130 of FIG. 1). By way of example, the table selection display area 502 includes a plurality of graphical elements 510-560.

More specifically, the table selection display area 502 displays a drop-down list 520 which allows the user to select a database. The drop-down list 520 can be dropped down to display a list of available databases. Illustratively, the user selects a database "DB HOSPITAL" having information about processes in a hospital. Furthermore, the table selection display area 502 displays a drop-down list 530 which allows the user to select related tables. The drop-down list 530 can be dropped down to display a list of all available tables (e.g., tables 132 of FIG. 1) from the selected database. In one embodiment, a database table can be selected using a computer mouse. Illustratively, the user uses the computer mouse to position a cursor 540 over an indication of a database table "DEMOGRAPHIC" in the drop-down list 530 and clicks the left mouse button to select this table.

It should be noted that use of a computer mouse is merely described by way of example and not for limiting the invention accordingly. Instead, any suitable input device, such as a pointing device, including a computer mouse, a light pen, or even a human finger in the case of a touch screen is contemplated. Furthermore, illustration of the drop-down lists 520 and 530 is also merely exemplary and not intended for limiting the invention accordingly. Instead, any suitable graphical elements for selection of databases and/or related database tables such as pop-up windows and the like are contemplated. More generally, any illustration of any specific graphical element is merely intended for purposes of illustration and should be understood as an example for any known or unknown element which is suitable to perform a corresponding described functionality.

Upon selection of the related tables, the user may click a pushbutton "DEFINE ISLANDS" 550 to continue with specification of logical islands or a pushbutton "CANCEL" 560 to disregard the selection of the related tables. Assume now that the user has clicked on the pushbutton "DEFINE ISLANDS" 550. Accordingly, the user interface 500 displays a logical island specification display area 504 as illustrated in FIG. 5B.

Figure 5B:
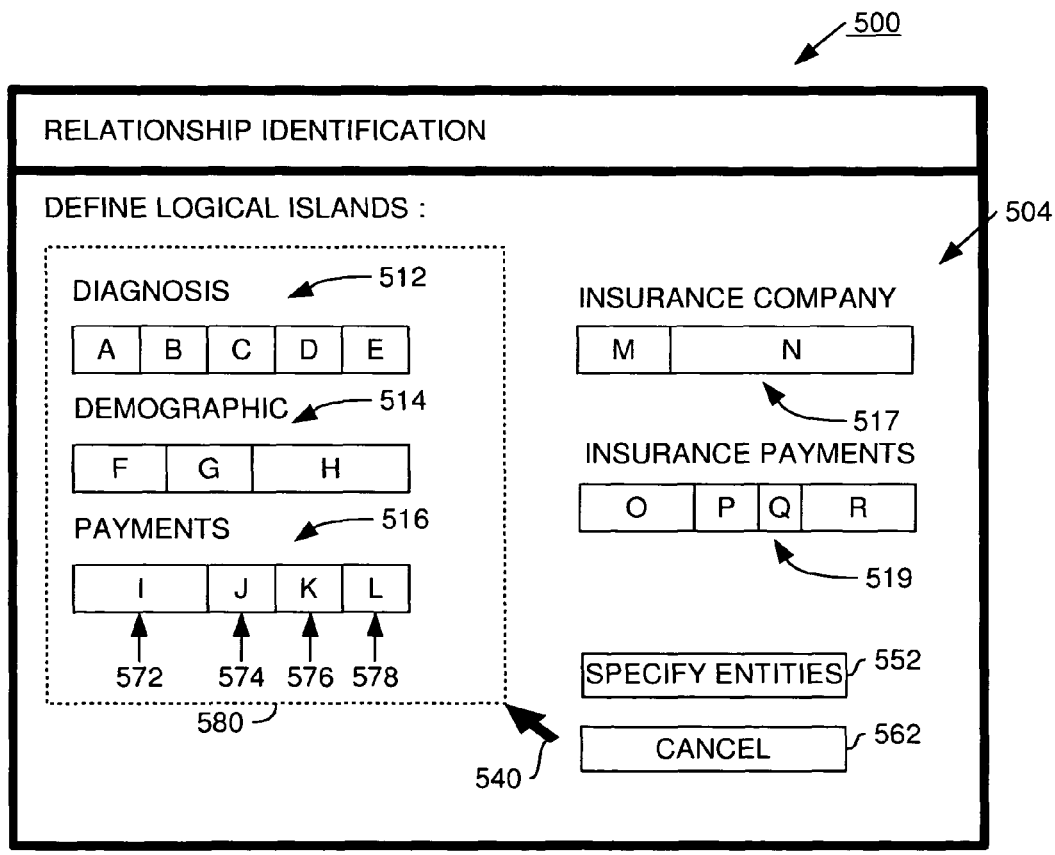

Referring now to FIG. 5B, the logical island specification display area 504 is configured to allow specification of logical islands using the related tables which have been selected using the table selection display area 502 of FIG. 5A. Illustratively, the logical island specification display area 504 displays a graphical representation of each selected table. Each graphical representation includes an identifier of the corresponding database table, such as a table name, and graphical selection elements representing all table columns of the corresponding table. In the given example, the logical island specification display area 504 displays a graphical representation 512 for the "Diagnosis" table, 514 for the "Demographic" table, 516 for the "Payments" table, 517 for the "Insurance Company" table and 519 for the "Insurance Payments" table. By way of example, the graphical representation 516 includes graphical selection elements 572 "I", 574 "J", 576 "K" and 578 "L", which represent the columns of the "Payments" table. However, it should be understood that the letters I-L are merely illustrated for brevity. In one embodiment these letters are placeholders for column identifiers, such as column names, as described in more detail below with reference to FIG. 5C.

Using the graphical representations 512, 514, 516, 517 and 519 displayed in the logical island specification display area 504, the user may organize at least one portion of the related tables into a logical island. To this end, the user positions in one embodiment the cursor 540 over an un-occupied location in the logical island specification display area 504 using the computer mouse. Then, the user drags the cursor 540 over the graphical representations of all related tables which should be organized into one logical island. Each thus selected graphical representation is highlighted. When all related tables which should be organized into the logical island are highlighted, the user releases the left mouse button to indicate completion of the specification of the logical island. In the given example, the user drags the cursor 540 over the graphical representations 512, 514 and 516 while pushing the left mouse button. Then, the user releases the left mouse button and a dashed rectangle 580 is displayed to indicate that the tables "Diagnosis", "Demographic" and "Payments" have been organized into a logical island. Similarly, the user may organize the tables "Insurance Company" and "Insurance Payments" into another logical island.

However, it should be noted that any suitable technique for organizing related tables into a logical island is broadly contemplated. For instance, the user may select a related table for a given logical island by positioning the cursor 540 over the corresponding graphical representation using the computer mouse and by subsequently double-clicking the left mouse button. Moreover, the user may drag-and-drop a given graphical representation into a particular logical island window, which can be created in response to a user request.

Upon specification of the logical islands, the user may click a pushbutton "SPECIFY ENTITIES" 552 to continue with specification of logical entities characterizing the logical islands or a pushbutton "CANCEL" 562 to disregard the specification of the logical islands. Assume now that the user has clicked on the pushbutton "SPECIFY ENTITIES" 552. Accordingly, the user interface 500 displays a logical entity specification display area 506 as illustrated in FIG. 5C.

Figure 5C:
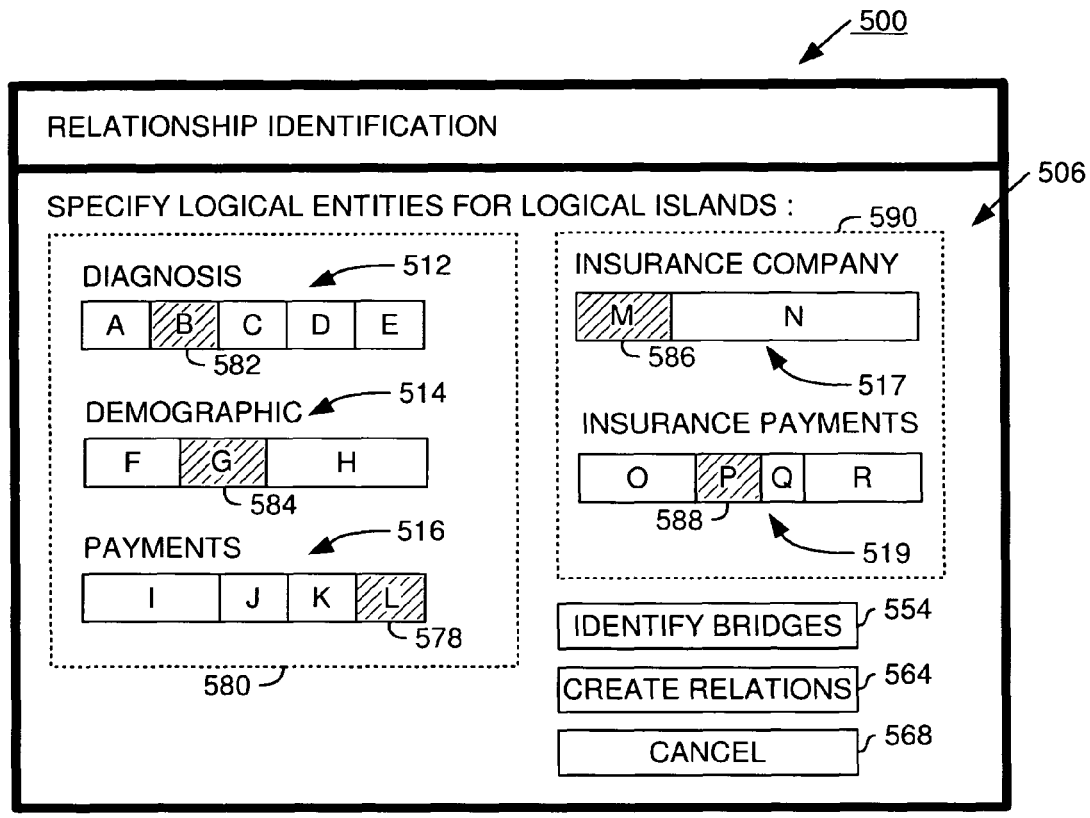

Referring now to FIG. 5C, the logical entity specification display area 506 is configured to allow specification of logical entities characterizing the logical islands which have been specified using the logical island specification display area 504 of FIG. 5B. Illustratively, the logical entity specification display area 506 displays the graphical representations of FIG. 5B which are organized into logical islands. As was noted above, the tables "Diagnosis", "Demographic" and "Payments" have been organized into a first logical island, as illustrated by the dashed rectangle 580. Assume further that the tables "Insurance Company" and "Insurance Payments" have been organized into a second logical island, as illustrated by a dashed rectangle 590.

The user may then use the logical entity specification display area 506 to identify for each logical island the logical entity which characterizes the logical island. Accordingly, the user identifies for each table in each logical island a table column containing information that identifies a corresponding particular logical entity associated with the given logical island. Thus, the user identifies logical relationships between all tables defining a given logical island.

Illustratively, the user uses the computer mouse to identify column 582 "B" of the "Diagnosis" table, column 584 "G" of the "Demographic" table and column 578 "L" of the "Payments" table for the first logical island. Furthermore, the user identifies column 586 "M" of the "Insurance Company" table and column 588 "P" of the "Insurance Payments" table for the second logical island. In the given example, column 582 "B" is the "patient_id" column of the "Diagnosis" table, column 584 "G" is the "id" column of the "Demographic" table and column 578 "L" is the "patient_id" column of the "Payments" table. Furthermore, column 586 "M" is the "id" column of the "Insurance Company" table and column 588 "P" is the "company_id" column of the "Insurance Payments" table. According to one aspect, the identified table columns are highlighted.

In one embodiment, upon specification of the logical entities, the user may click a pushbutton "IDENTIFY BRIDGES" 554 to continue with specification of one or more logical bridges between the logical islands, a pushbutton "CREATE RELATIONS" 564 to create relations specifications on the basis of the identified logical relationships without specifying logical bridges (e.g., relations specifications of Table II), or a pushbutton "CANCEL" 568 to disregard the specification of the logical entities. Assume now that the user has clicked on the pushbutton "IDENTIFY BRIDGES" 554. Accordingly, the user interface 500 displays a logical bridge specification display area 508 as illustrated in FIG. 5D.

Figure 5D:
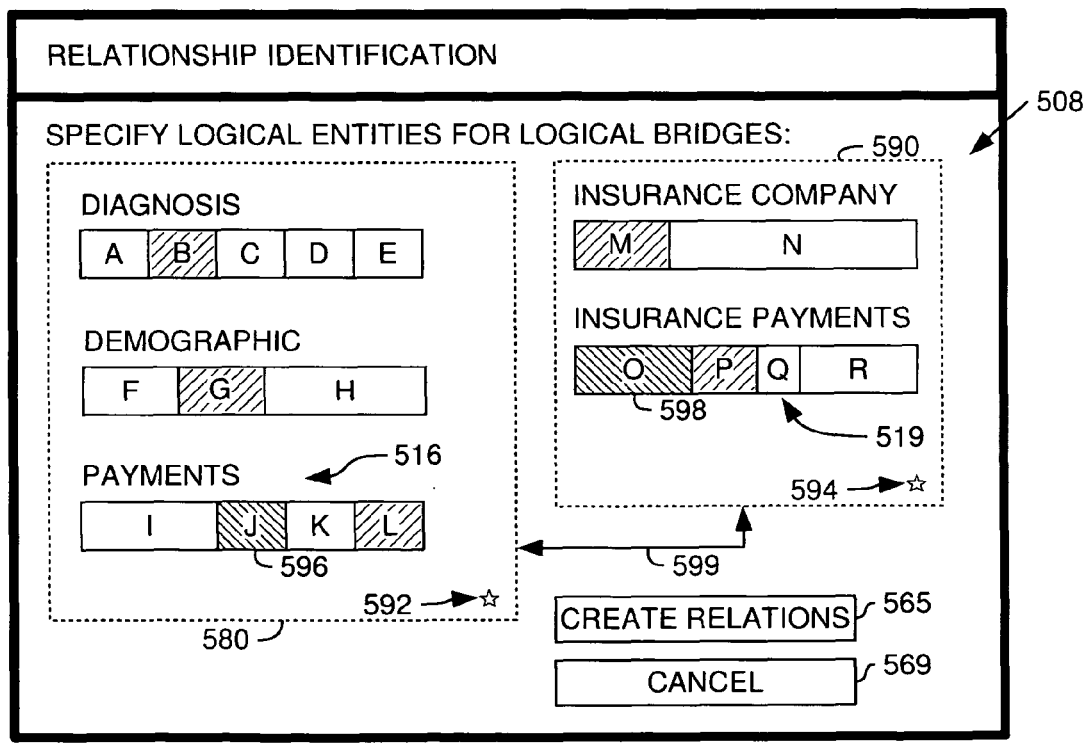

Referring now to FIG. 5D, the logical bridge specification display area 508 is configured to allow specification of logical bridges between logical islands which have been defined using the logical island specification display area 504 of FIG. 5B and the logical entity specification display area 506 of FIG. 5C. Illustratively, the logical bridge specification display area 508 displays the graphical representations of FIG. 5B and the logical islands 580 and 590 with the respective highlighted table columns of FIG. 5C. As was noted above, specification of a logical bridge requires specification of related logical islands. Illustratively, the user uses the computer mouse to select the logical islands 580 and 590 in order to specify a logical bridge between these two logical islands. In one embodiment, the user uses the computer mouse to click on an un-occupied location in each logical island which is to be linked via the logical bridge. The selected logical islands can then be marked-up to indicate that they have been selected. As in the given example the logical islands 580 and 590 are selected, selection of these logical islands is schematically illustrated by stars 592 and 594.

The user may then use the logical bridge specification display area 508 to identify for each logical island a corresponding logical entity which characterizes the logical bridge. Accordingly, using the computer mouse the user identifies a table column from a particular table in each logical island that contains information which identifies the corresponding logical entity. Thus, the user identifies a logical relationship between a particular table in the first logical island and a particular table in the second logical island, which represents the logical bridge.

Illustratively, the user identifies column 596 "J" of the "Payments" table for the first logical island. Furthermore, the user identifies column 598 "O" of the "Insurance Payments" table for the second logical island. In the given example, column 596 "J" is the "insurance_payment_number" column of the "Payments" table and column 598 "O" is the "payment_ num" column of the "Insurance Payments" table.

In one embodiment, upon specification of the logical entities, a graphical representation is displayed to indicate that the logical bridge(s) has been defined. Illustratively, a double-headed arrow 599 illustrates that the logical bridge between the first logical island 580 and the second logical island 590 has been created in the given example. The user may then click a pushbutton "CREATE RELATIONS" 565 to create relations specifications on the basis of the identified logical relationships (e.g., relations specifications of Table IV), or a pushbutton "CANCEL" 569 to disregard the specification of the logical bridge(s).

It should be noted that the user interface 500 of FIGS. 5A-D has merely been described by way of example and is, thus, not intended to limit the invention accordingly. Instead, various modifications to the described user interface are suitable to accomplish the described functionalities. For instance, in the logical bridge specification display area 508 of FIG. 5D, a pushbutton such as "CREATE BRIDGE RELATION SPECIFICATION" can be displayed which allows to initialize creation of a relation specification (e.g., relation specification of Table II) for the logical bridge only. Moreover, the logical island specification display area 504 of FIG. 5B may display a pushbutton such as "CREATE NEW ISLAND WINDOW" which allows to create a logical island window for each logical island to be created. Accordingly, these and other modifications to the user interface 500 are broadly contemplated. Furthermore, it should be noted that any reference herein to particular values, definitions, programming languages and examples is merely for purposes of illustration. Accordingly, the invention is not limited by any particular illustrations and examples.

While the foregoing is directed to embodiments of the present invention, other and further embodiments of the invention may be devised without departing from the basic scope thereof, and the scope thereof is determined by the claims that follow.

What is claimed is:

1. A method for identifying relationships between tables in a database, comprising:
   receiving user input selecting a plurality of tables from the database;
   in response to the user input selecting the plurality of tables, displaying in a graphical user interface a selection area containing graphical representations of each column of the plurality of tables;
   in response to user input, organizing the plurality of tables into a logical island defining a logical unit related to a particular logical entity; wherein organizing comprises creating, in the graphical user interface, a graphical visual aid that identifies the plurality of tables as defining the logical island;
   receiving user input selecting, for each of the plurality of tables, a table column containing information that identifies the particular logical entity in the table, whereby the selected table columns of different tables define logical relationships between the different tables in the logical island;
   in response to receiving user input selecting the table columns, visually differentiating the graphical representations of each selected column from unselected columns in the selection area; and
   programmatically generating relations specifications describing the logical relationships between the different tables in the logical island on the basis of the identified table columns.

2. The method of claim 1, further comprising:
   receiving user input selecting another plurality of tables from the database;
   organizing the other plurality of tables into another logical island defining a logical unit of tables related to another logical entity;
   receiving user input specifying a logical bridge between the logical island and the other logical island, the logical bridge defining a logical relationship between the logical islands;
   in response to receiving user input specifying the logical bridge, visually representing the logical bridge; and
   programmatically generating a relation specification describing the logical relationship between the logical islands on the basis of the logical bridge.

3. The method of claim 2, wherein receiving user input specifying a logical bridge comprises:
   receiving user input identifying, for one of the tables from the logical island and one of the tables from the other logical island, a table column containing information that identifies for the logical bridge a logical entity to which both tables are related.

4. The method of claim 3, wherein creating the relation specification describing the logical relationship between the logical islands is performed on the basis of the table columns containing information that identifies the logical entity to which the column of the one of the tables from the logical island and the column of the one of the tables from the other logical island are related.

5. The method of claim 1, wherein the tables in the database are organized according to a star schema comprising a single root table connected to a multiplicity of linked tables, the star schema defining one or more parent-child relations.

6. The method of claim 5, wherein the plurality of tables in the logical island defines a parent-child relation.

7. The method of claim 1, wherein the tables in the database are organized according to a snowflake schema comprising a plurality of root tables, each connected to a multiplicity of linked tables, the snowflake schema defining a plurality of parent-child relations.

8. The method of claim 7, wherein the plurality of tables in the logical island defines a parent-child relation, the method further comprising:
   receiving user input selecting another plurality of tables from the database, the other plurality of tables defining another parent-child relation;
   organizing the other plurality of tables into another logical island defining a logical unit of tables related to another logical entity;
   receiving user input specifying a logical bridge between the logical island and the other logical island, the logical bridge defining a logical relationship between the logical islands; and
   creating a relation specification describing the logical relationship between the logical islands on the basis of the logical bridge.

9. The method of claim 1, wherein the database is abstractly described by a data abstraction model having a plurality of logical field specifications, each defining a particular logical field associated with one or more columns of tables from the database, the method further comprising:
   creating abstract relations specifications describing the logical relationships between the different tables in the logical island on the basis of the identified table columns, the abstract relations specifications linking logical fields of the data abstraction model to each other; and including the abstract relations specifications with the data abstraction model.

10. A computer-readable storage medium containing a program which, when executed by a processor, performs operations for identifying relationships between tables in a database, the operations comprising displaying a graphical user interface, the graphical user interface, comprising:
   a table selection display area allowing a user to select a plurality of tables from the database;
   a logical island definition area containing graphical representations of each column of the selected plurality of tables;
   a relations identification display area allowing the user to:
      create a graphical visual aid to organize the plurality of tables into a logical island defining a logical unit related to a particular logical entity; and
      select, for each of the plurality of tables, a table column containing information that identifies the particular logical entity in the table, whereby the selected table columns of different tables define logical relationships between the different tables in the logical island; wherein, in response to receiving the selection of the table columns, the graphical user interface visually differentiates the graphical representations of each selected column from unselected columns in the logical island definition area; and
   a user-selectable element which, when selected, causes programmatic generation of relations specifications describing the logical relationships between the different tables in the logical island on the basis of the identified table columns.

11. The computer-readable storage medium of claim 10, wherein the table selection display area further allows the user to select another plurality of tables from the database; and the relations identification display area further allows the user to organize the other plurality of tables into another logical island defining a logical unit of tables related to another logical entity.

12. The computer-readable storage medium of claim 11, wherein the relations identification display area further allows the user to specify a logical bridge between the logical island and the other logical island, the logical bridge defining a logical relationship between the logical islands.

13. The computer-readable storage medium of claim 12, wherein the operations further comprise:
   creating a relation specification describing the logical relationship between the logical islands on the basis of the logical bridge.

14. The computer-readable storage medium of claim 12, wherein the relations identification display area further allows the user to select from one of the tables from the logical island and one of the tables from the other logical island, a table column containing information that identifies for the logical bridge a logical entity to which both tables are related.

15. The computer-readable storage medium of claim 14, wherein the operations further comprise:
   creating a relation specification describing the logical relationship between the logical islands defined by the logical bridge on the basis of the table columns containing information that identifies the logical entity to which the column of the one of the tables from the logical island and the column of the one of the tables from the other logical island are related.

16. The computer-readable storage medium of claim 11, wherein the relations identification display area is configured to:
   display the logical island in a first window; and
   display the other logical island in a second window.

17. The computer-readable storage medium of claim 16, wherein the relations identification display area further allows the user to select from one of the tables displayed in the first window and one of the tables displayed in the second window, a table column containing information that identifies for a logical bridge a logical entity to which both tables are related.

18. The computer-readable storage medium of claim 17, wherein the operations further comprise:
   creating a relation specification describing the logical relationship between the logical islands defined by the logical bridge on the basis of the table columns containing information that identifies the logical entity to which the column of the one of the tables from the logical island and the column of the one of the tables from the other logical island are related.

19. A system, comprising:
   at least one processor;
   one or more computer readable storage media readable by the at least one processor and containing a database, a relationship manager, and a graphical relations identification user interface; the graphical relations identification user interface comprising:
      a table selection display area allowing a user to select a plurality of tables from the database;
      a logical island definition area containing graphical representations of each column of the selected plurality, of tables;
      a relations identification display area allowing the user to:
         create a graphical visual aid visually identifying the plurality of tables as a logical island defining a logical unit related to a particular logical entity; and
         select, for each of the plurality of tables, a table column containing information that identifies the particular logical entity in the table, whereby the selected table columns of different tables define logical relationships between the different tables in the logical island; wherein, in response to receiving the selection of the table columns, the graphical user interface visually differentiates the graphical representations of each selected column from unselected columns in the logical island definition area; and
      a user-selectable element which, when selected, executes the relationship manager, which programmatically generates relations specifications describing the logical relationships identified via the relations identification user interface.

20. The system of claim 19, further comprising:
   a data abstraction model abstractly describing the database, the data abstraction model having a plurality of logical field specifications, each defining a particular logical field associated with one or more columns of tables from the database; and
   wherein the relationship manager is further configured to:
      create abstract relations specifications describing the identified relationships between the tables, the abstract relations specifications linking logical fields of the data abstraction model to each other; and
      include the abstract relations specifications with the data abstraction model.

* * * * *